United States Patent
Gottron et al.

(10) Patent No.: US 12,126,468 B2
(45) Date of Patent: Oct. 22, 2024

(54) SWITCH FOR CONNECTING FIELD APPARATUSES AND DEVICE FOR GALVANICALLY ISOLATING AT LEAST ONE APPARATUS WHICH IS CONNECTABLE TO A 2-WIRE ETHERNET BUS SYSTEM

(71) Applicant: Siemens Aktiengesellschaft, Munich (DE)

(72) Inventors: Jens Gottron, Karlsruhe (DE); Martin Meyer, Nuremberg (DE); Ivan Knjasev, Mannheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 201 days.

(21) Appl. No.: 17/852,640

(22) Filed: Jun. 29, 2022

(65) Prior Publication Data
US 2023/0006864 A1    Jan. 5, 2023

(30) Foreign Application Priority Data
Jun. 30, 2021   (EP) ..................................... 21182630

(51) Int. Cl.
*H04L 25/02*   (2006.01)
*H02H 9/00*    (2006.01)

(52) U.S. Cl.
CPC ......... *H04L 25/0266* (2013.01); *H02H 9/008* (2013.01); *H04L 25/0272* (2013.01)

(58) Field of Classification Search
CPC ......... H02H 9/008; H04L 12/10; H04L 12/40; H04L 12/4013; H04L 12/413; H04L 25/0266; H04L 25/0272
See application file for complete search history.

(56) References Cited

U.S. PATENT DOCUMENTS 7,701,092 B1 *   4/2010   Parker ..................... H04L 12/10
                                                                                          307/17
8,352,651 B2 *   1/2013   Parfitt ................. G05B 19/054
                                                                                          326/38
(Continued)

FOREIGN PATENT DOCUMENTS

CN    102714887    10/2012
CN    103427813    12/2013
(Continued)

OTHER PUBLICATIONS

EP Search Report dated Dec. 9, 2021 based on EP 21182630 filed Jun. 30, 2021.

*Primary Examiner* — David B Lugo
(74) *Attorney, Agent, or Firm* — Cozen O'Connor

(57) ABSTRACT

Switch for connecting field apparatuses and device for galvanically isolating at least one apparatus which is connectable to a 2-wire Ethernet bus system includes an uplink and a downlink PHY interface device that each have a transmitting unit and a receiving unit that has two output terminals for providing a received ternary-coded signal as differential signal, includes an uplink and a downlink signal split device that are each connected to the output terminals of an assigned receiving unit and are configured to split a ternary-coded signal provided as differential signal into two binary coded signals, and includes an uplink and a downlink optocoupler device that are each connected to an assigned signal split device and are configured to transfer two received binary-coded signals to a transmitting unit of an assigned PHY interface device.

17 Claims, 3 Drawing Sheets

(56) References Cited

U.S. PATENT DOCUMENTS

| | | | |
|---|---|---|---|
| 2009/0092398 A1* | 4/2009 | Graber | H04B 10/801 |
| | | | 398/116 |
| 2012/0257659 A1 | 10/2012 | Braz et al. | |
| 2013/0307589 A1 | 11/2013 | Danklefsen et al. | |
| 2014/0008997 A1 | 1/2014 | Azancot et al. | |
| 2015/0102943 A1 | 4/2015 | de Greef et al. | |
| 2016/0065701 A1* | 3/2016 | Shepard | H04L 69/323 |
| | | | 713/323 |
| 2019/0088410 A1 | 3/2019 | Goodman | |
| 2020/0050166 A1 | 2/2020 | Hinderer | |
| 2021/0081346 A1 | 3/2021 | Nixon et al. | |
| 2022/0190824 A1 | 6/2022 | Kruck | |

FOREIGN PATENT DOCUMENTS

| | | |
|---|---|---|
| CN | 107300883 | 10/2017 |
| CN | 107302398 | 10/2017 |
| CN | 110830343 | 2/2020 |
| CN | 112636833 | 4/2021 |
| CN | 113875157 | 12/2021 |
| DE | 102020124313 | 3/2021 |
| EP | 0382646 | 8/1990 |
| EP | 2784977 | 10/2014 |
| WO | 2007129031 | 11/2007 |

\* cited by examiner

SWITCH FOR CONNECTING FIELD APPARATUSES AND DEVICE FOR GALVANICALLY ISOLATING AT LEAST ONE APPARATUS WHICH IS CONNECTABLE TO A 2-WIRE ETHERNET BUS SYSTEM

BACKGROUND OF THE INVENTION

1. Field of the Invention

The present invention relates to a switch for connecting field apparatuses and device for galvanically isolating at least one apparatus which is connectable to a 2-wire Ethernet bus system, in particular of a field apparatus within an industrial automation system.

2. Description of the Related Art

Industrial automation systems usually comprise a multiplicity of automation apparatuses networked together via an industrial communication network and are used in the context of manufacturing automation or process automation for the control or regulation of installations, machines or apparatuses. On account of time-critical boundary conditions in industrial automation systems, predominantly real-time communication protocols, such as PROFINET, PROFIBUS, Real-Time Ethernet or Time Sensitive Networking (TSN), are used for communication between automation apparatuses. In particular, control services or applications can be distributed among currently available servers or virtual machines of an industrial automation system in an automated manner and depending on capacity utilization.

Interruptions of communication connections between computer units of an industrial automation system or automation apparatuses can result in an undesired or unnecessary repetition of a communication of a service request. Moreover, uncommunicated or incompletely communicated messages can, for example, prevent an industrial automation system from transitioning to or staying in a safe operating state.

In Ethernet-based communication networks, problems can arise if network resources for a communication of data streams or data frames with real-time requirements are used in a competing manner for a communication of data frames having a large payload data content without specific quality of service requirements. This can ultimately have the effect that data streams or data frames with real-time requirements are not communicated in accordance with a requested or required quality of service.

WO 2007/129031A1 discloses a data signal isolation device comprising a first media converter. The first media converter is provided for converting electrical output data signals into optical output data signals. Moreover, an optical data signal transmission device is provided, which is designed for transmitting the optical output data signals. Furthermore, the data signal isolation device comprises a second media converter, designed to convert the optical output data signals back into electrical output data signals. In addition, an intrinsically safe power supply is provided. Furthermore, the optical data signal transmission device has an electrical isolation gap. Furthermore, the second media converter is fed by an intrinsically safe power supply.

EP2784977A1 describes a coupler unit for power and data transmission in potentially explosive environments via Ethernet lines. The coupler unit has a supply-side terminal for at least four-core Ethernet lines for combined power and data transmission. A separating filter unit for the frequency-selective output coupling of a supply current and a data signal transmitted via a supply-side Ethernet line is connected to the supply-side terminal. A terminal for Ethernet lines for combined power and data transmission via two cores is provided on the load side. A mixer unit for the frequency-selective coupling of a regulated supply current and a data signal to be transmitted via a load-side Ethernet line to a common core pair is connected to the load-side terminal. The coupler unit enables an adaptation of non-intrinsically safe Power over Ethernet to intrinsically safe Power over Ethernet that is provided via two-core lines.

Ethernet Advanced Physical Layer (Ethernet APL) constitutes an OSI Layer 1 extension that specifically takes account of requirements in the process industry. Ethernet APL places special emphasis in particular on high-speed communication over large distances and also on 2-core cables and protective measures for safe operation within potentially explosive areas. As a barrier for realizing intrinsic safety, an electronic circuit is provided in each case at outputs and inputs of switches and field apparatuses. Such circuits prevent ignitable electrical energy from entering connections. In particular, apparatuses that are operated in potentially explosive areas must be protected by a protection class in accordance with the series of International Electrotechnical Commission (IEC) standards 60079. This ensures that an explosive environment cannot be ignited by hot surfaces or spark generation even in the case of multiple faults. This is achieved through safe limiting of voltages and/or currents in circuits configured to be intrinsically safe.

A further central requirement for circuits configured to be intrinsically safe consists in a safe galvanic isolation of the circuits. In the case of pure power supply applications, such requirements can be satisfied, for example, via a transformer for a switched-mode power supply. If the intention is for data to be transmitted at a high data rate, in particular starting from 100 Mbit/s in addition to power transmission, galvanic isolation via a transformer constitutes an inadequate solution.

SUMMARY OF THE INVENTION

In view of the foregoing, it is therefore and object of the present to provide a device for galvanically isolating at least one apparatus that is connectable to a 2-wire Ethernet bus system, where the device enables both the power supply of the apparatus and high data transmission rates and can be operated in potentially explosive environments, and also to provide a suitable solution for implementing the invention.

This and other objects and advantages are achieved in accordance with the invention by a switch and device for galvanically isolating at least one apparatus that is connectable to the 2-wire Ethernet bus system that has an uplink and a downlink physical layer (PHY) interface device, where each uplink and a downlink PHY interface device comprises a transmitting unit and a receiving unit. The receiving units each have two output terminals for providing a received ternary-coded signal as differential signal. The PHY interface devices can be in particular in each case an integrated circuit or a functional group of a circuit that is used to implement coding and decoding of data between a digital system and a physical propagation medium. Preferably, the device in accordance with the invention is configured for use in an intrinsically safe circuit and, in accordance with IEC60079-11, has a safe link to line elements to be protected.

Moreover, the device in accordance with the invention comprises an uplink and a downlink signal split device, each of which is connected to the output terminals of an assigned receiving unit and is configured to split a ternary-coded signal provided as differential signal into two binary-coded signals. Furthermore, an uplink and a downlink optocoupler device are provided, each of which is connected to an assigned signal split device and is configured to transfer two received binary-coded signals to a transmitting unit of an assigned PHY interface device. Preferably, the uplink signal split device is connected to the output terminals of the receiving unit of the uplink PHY interface device, while the downlink signal split device is connected to the output terminals of the receiving unit of the downlink PHY interface device.

Overall, the present invention enables safe galvanic isolation of an intrinsically safe circuit and also limiting of power, current, voltage to a no longer ignitable level via an optical isolation method that does not cause over-voltages on the secondary side. The optical isolation method allows the present invention to be used at high data rates, in particular, because no capacitive loads are present. Preferably, the apparatus that is connectable to the 2-wire Ethernet bus system is configured in accordance with Ethernet Advanced Physical Layer. Furthermore, the device in accordance with the invention is advantageously configured for connection to multiplexed supply lines of the 2-wire Ethernet bus system that are provided for simultaneous power and data transmission.

The uplink and downlink signal split devices can, for example, each be formed by comparators, switching transistors or logic gates. Preferably, the uplink and downlink signal split devices are each formed by two comparators for a respective differential signal component and are configured to compare the respective differential signal component with a reference signal level.

In accordance with a further preferred embodiment of the present invention, the ternary-coded signal is an MLT-3 signal comprising a negative signal level, a zero signal level and a positive signal level. The two binary-coded signals each comprise a zero signal level and a one signal level. Advantageously, the signal split devices are accordingly each configured to convert (i) the negative signal level of the MLT-3 signal to the zero signal level of a first binary-coded signal and to the one signal level of a second binary-coded signal, (ii) the zero signal level of the MLT-3 signal to the same signal level of the first and second binary-coded signals, and (iii) the positive signal level of the MLT-3 signal to the one signal level of the first binary-coded signal and to the zero signal level of the second binary-coded signal.

As an alternative thereto, the signal split devices can each be configured to convert (i) the negative signal level of the MLT-3 signal to the one signal level of a first binary-coded signal and to the zero signal level of a second binary-coded signal, (ii) the zero signal level of the MLT-3 signal to the same signal level of the first and second binary-coded signals, and (iii) the positive signal level of the MLT-3 signal to the zero signal level of the first binary-coded signal and to the one signal level of the second binary-coded signal.

In both above-described embodiments, the signal split devices are advantageously each configured to convert (i) the zero signal level of the MLT-3 signal to the zero signal level of the first binary-coded signal and to the zero signal level of the second binary-coded signal or (ii) the zero signal level of the MLT-3 signal to the one signal level of the first binary-coded signal and to the one signal level of the second binary-coded signal.

Preferably, the uplink optocoupler device is connected to the uplink signal split device, while the downlink optocoupler device is connected to the downlink signal split device. Here, the optocoupler devices each comprise 2 digital optocouplers for transferring in each case one of the two binary-coded signals. The use of digital optocouplers enables a cost-effective implementation of the disclosed embodiments of the present invention.

In particular, the optocoupler devices can each comprise two digital optocouplers, each having an input-side anode terminal, an input-side cathode terminal, a supply voltage terminal, an output signal terminal and an output-side ground terminal. Here, the cathode terminals, the supply voltage terminals and the output signal terminals are each interconnected with limiting resistors for the purpose of voltage, current and/or power limiting. In this way, the digital optocouplers can be effectively protected against overloads in fault situations.

The switch in accordance with the invention for connecting field apparatuses to a 2-wire Ethernet bus system comprises in particular a device for galvanic isolation in accordance with the disclosed embodiments. Specifically, the switch comprises, besides a primary switch and a secondary switch, a device for galvanic isolation comprising an uplink and a downlink PHY interface device, an uplink and a downlink signal split device and also an uplink and a downlink optocoupler device. The primary switch is connected to the uplink PHY interface device, while the secondary switch is connected to the downlink PHY interface device. The uplink and downlink PHY interface devices each comprise a transmitting unit and a receiving unit. Here, the receiving units each have two output terminals for providing a received ternary-coded signal as differential signal.

The uplink and downlink signal split devices of the switch in accordance with the invention are each connected to the output terminals of an assigned receiving unit and configured to split a ternary-coded signal provided as a differential signal into two binary coded signals. Furthermore, the uplink and downlink optocoupler devices are each connected to an assigned signal split device and are configured to transfer two received binary-coded signals to a transmitting unit of an assigned PHY interface device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below on the basis of an exemplary embodiment with reference to the drawings, in which.

DETAILED DESCRIPTION OF THE EXEMPLARY EMBODIMENTS

Figure 1:
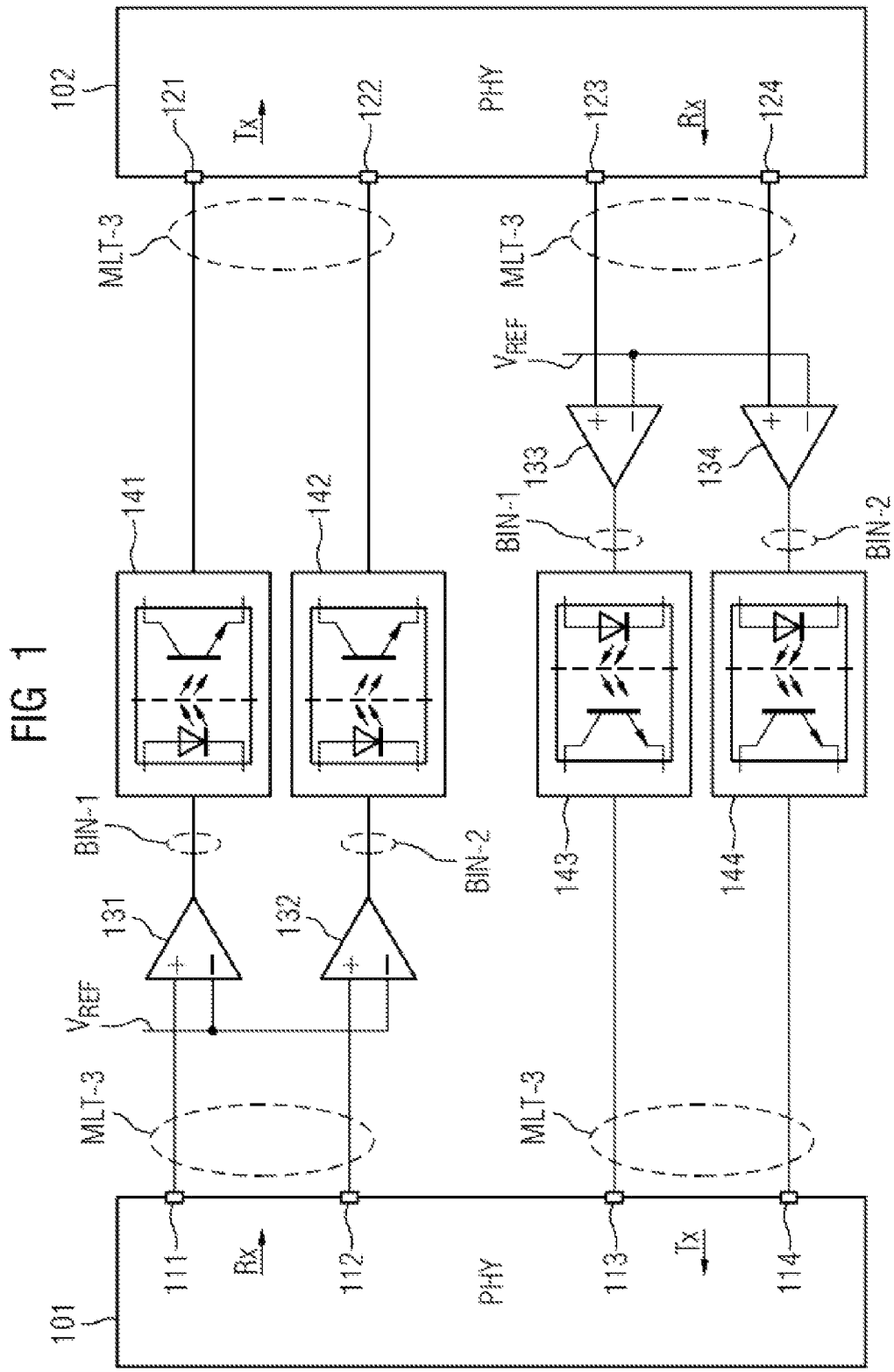
FIG. 1 shows a device for the galvanic isolation of at least one apparatus which is connectable to a 2-wire Ethernet bus system in accordance with the invention.

The device for the galvanic isolation of at least one apparatus which is connectable to a 2-wire Ethernet bus system, as illustrated in FIG. 1, is preferably configured for use in an intrinsically safe circuit and advantageously, in accordance with IEC60079-11, has a safe link to line elements to be protected. Here, the at least one apparatus that is connectable to the 2-wire Ethernet bus system is configured, for example, in accordance with Ethernet Advanced Physical Layer. In accordance with one particularly preferred embodiment, the device is configured for connection to multiplexed supply lines of the 2-wire Ethernet bus system that are provided for simultaneous power and data transmission.

As shown in FIG. 1, the device has an uplink and a downlink PHY interface device 101, 102, each comprising a transmitting unit Tx and a receiving unit Rx. The receiving units Rx each have two output terminals 111-112, 123-124 for providing a received ternary-coded signal as differential signal MLT-3. Moreover, the device has an uplink and a downlink signal split device 131-132, 133-134, each connected to the output terminals 111-112, 123-124 of an assigned receiving unit Rx and configured for splitting a ternary-coded signal MLT-3 provided as differential signal into two binary coded signals BIN-1, BIN-2.

In the present exemplary embodiment, the uplink and downlink signal split devices are each formed by two comparators 131-132, 133-134 for a respective differential signal component, which is present at one of the output terminals 111-112, 123-124, and configured to compare the respective differential signal component with a reference signal level $V_{REF}$. As an alternative to this configuration, the uplink and downlink signal split devices can, in principle, also each be formed by switching transistors or logic gates.

The uplink signal split device 131-132 is connected to the output terminals 111-112 of the receiving unit Rx of the uplink PHY interface device 101, while the downlink signal split device 133-134 is connected to the output terminals 123-124 of the receiving unit Rx of the downlink PHY interface device 102. Moreover, an uplink and a downlink optocoupler device 141-142, 143-144 are provided, each connected to an assigned signal split device 131-132 and configured to transfer two received binary-coded signals BIN-1, BIN-2 to a transmitting unit TX of an assigned PHY interface device 101, 102. Here, the uplink optocoupler device 141-142 is connected to the uplink signal split device 131-132, while the downlink optocoupler device 143-144 is connected to the downlink signal split device 133-134. The optocoupler devices each comprise 2 digital optocouplers 141-142, 143-144 for transferring, in each case, one of the two binary-coded signals BIN-1, BIN-2.

On the downlink and uplink sides, the optocouplers 141-142, 143-144, via their output terminals, each once again provide a ternary-coded signal as a differential signal MLT-3, which is fed in each case to two input terminals 121-122, 113-114 of the transmitting units Tx of the PHY interface devices 102, 101. In the present exemplary embodiment, the ternary-coded signal is an MLT-3 signal comprising a negative signal level, a zero signal level and a positive signal level. By contrast, the two binary-coded signals BIN-1, BIN-2 each comprise a zero signal level and a one signal level.

The signal split devices formed by the comparators 131-132, 133-134 are each configured to convert (i) the negative signal level of the MLT-3 signal to the zero signal level of a first binary-coded signal BIN-1 and to the one signal level of a second binary-coded signal BIN-2, (ii) the zero signal level of the MLT-3 signal to the same signal level of the first and second binary-coded signals BIN-1, BIN-2 and (iii) the positive signal level of the MLT-3 signal to the one signal level of the first binary-coded signal BIN-1 and to the zero signal level of the second binary-coded signal BIN-2. Here, the zero signal level of the MLT-3 signal can be converted (i) to the zero signal level of the first binary-coded signal BIN-1 and to the zero signal level of the second binary-coded signal BIN-2 or alternatively (ii) to the one signal level of the first binary-coded signal BIN-1 and to the one signal level of the second binary-coded signal BIN-2.

The table below illustrates the above-described conversion between the MLT-3 signal and the two binary-coded signals BIN-1, BIN-2 for the case where the zero signal level of the MLT-3 signal is converted in each case to the zero signal level of the binary-coded signals BIN-1, BIN-2.

| MLT-3 | BIN-1 | BIN-2 |
| --- | --- | --- |
| Negative (−1) | 0 | 1 |
| Zero (0) | 0 | 0 |
| Positive (1) | 1 | 0 |

In accordance with an alternative embodiment, it would be possible to convert (i) the negative signal level of the MLT-3 signal to the one signal level of a first binary-coded signal BIN-1 and to the zero signal level of a second binary-coded signal BIN-2, (ii) the zero signal level of the MLT-3 signal to the same signal level of the first and second binary-coded signals BIN-1, BIN-2, and (iii) the positive signal level of the MLT-3 signal to the zero signal level of the first binary-coded signal BIN-1 and to the one signal level of the second binary-coded signal BIN-2.

For the case where the zero signal level of the MLT-3 signal is converted in each case to the zero signal level of the binary-coded signals BIN-1, BIN-2, this would correspond to an interchange of the contents of the columns in the above table for the binary-coded signals BIN-1, BIN-2.

Figure 2:
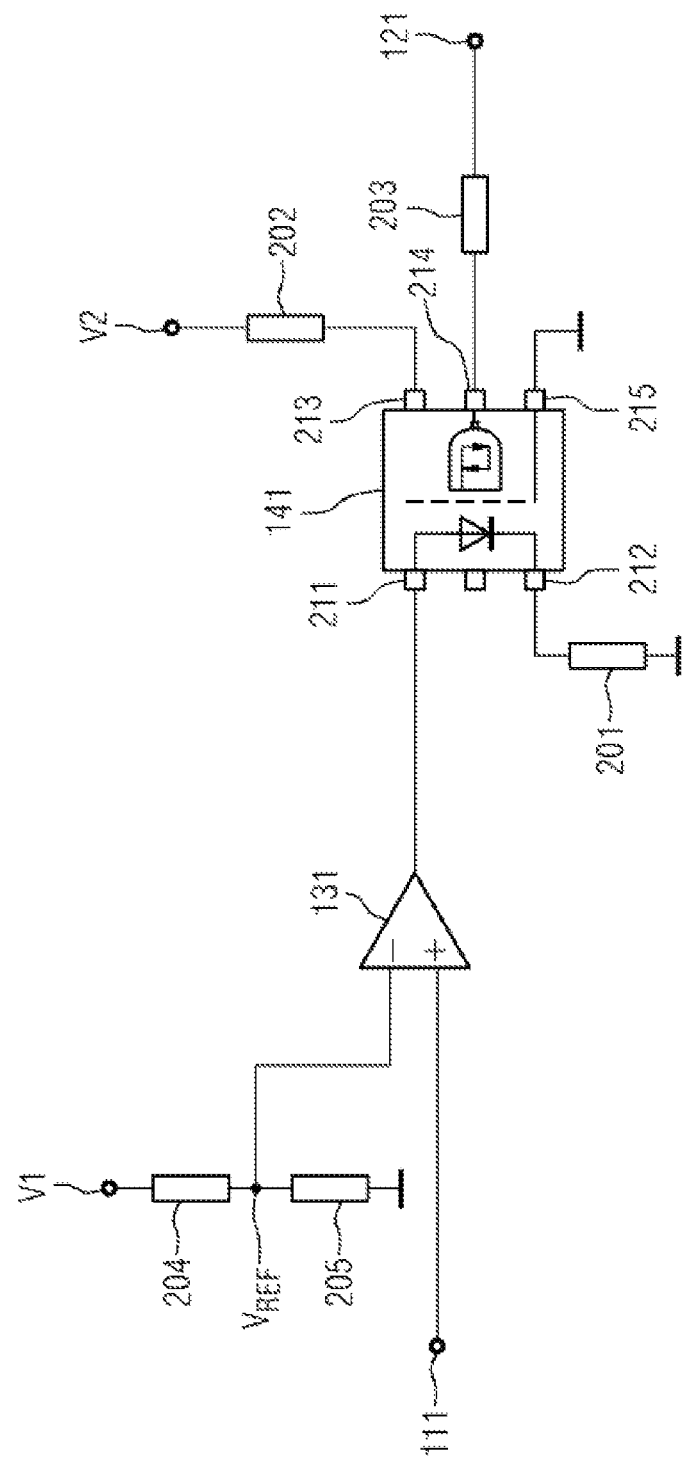
FIG. 2 shows an arrangement composed of a comparator and a digital optocoupler with limiting resistors, where the arrangement is comprised by the device of FIG. 1.
Figure 3:
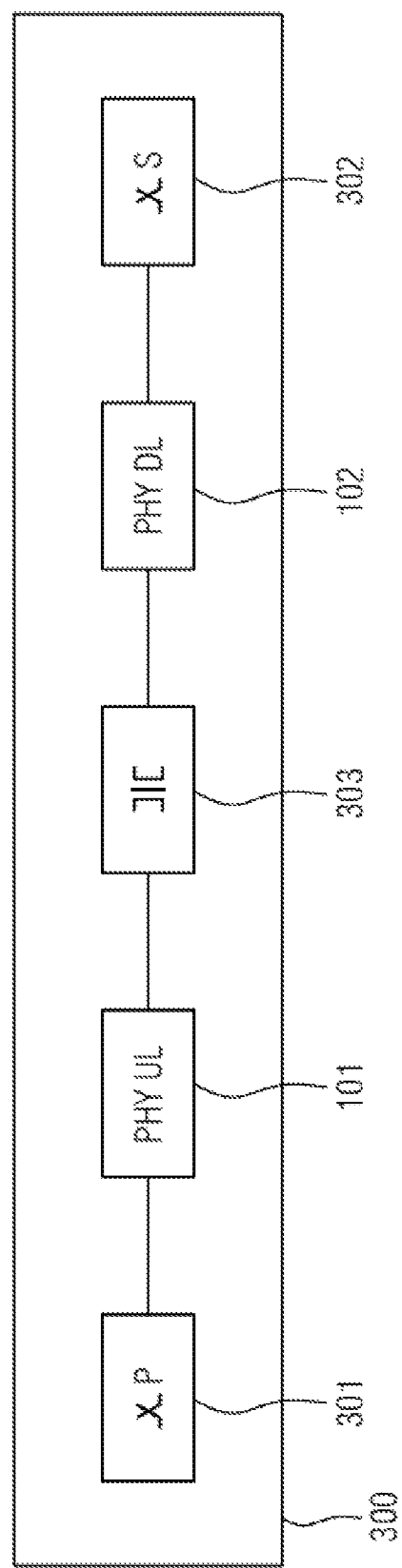
FIG. 3 shows a switch comprising the device of FIG. 1.

FIG. 2 is an illustration of an arrangement composed of a comparator and a digital optocoupler, the arrangement being comprised by the device in accordance with FIG. 1, where the digital optocoupler is interconnected with limiting resistors for the purpose of voltage, current and/or power limiting. The comparator 131 and the digital optocoupler 141 are considered by way of example in FIG. 2. The reference signal level $V_{REF}$ at the comparator 131 is "tapped off" from a first voltage source V1 via a voltage divider having 2 resistors 204, 205 and is compared with the differential signal component present at the output terminal 111. In the present exemplary embodiment, a difference between the differential signal component and the reference signal level $V_{REF}$ is amplified. A correspondingly amplified differential signal is supplied to an input-side anode terminal 211 of the digital optocoupler 141.

Besides the anode terminal 211, the digital optocoupler 141 comprises an input-side cathode terminal 212, a supply voltage terminal 213, an output signal terminal 214 and an output-side ground terminal 215. The cathode terminal 212, the supply voltage terminal 213 and the output signal terminal 215 are each interconnected with a limiting resistor 201, 202, 203. Here, a first limiting resistor 201 is connected between the cathode terminal 212 and ground. A second limiting resistor 202 is connected between the supply voltage terminal 213 and a second voltage source V2, while a third limiting resistor 203 is connected between the output signal terminal 215 and the input terminal 121 of the transmitting unit Tx of the downlink PHY interface device 102. These limiting resistors 201, 202, 203 enable components to be protected against an overload in the case of a fault, without a signal integrity being impermissibly influenced.

Based on the device for galvanic isolation illustrated in FIG. 1, it is possible to realize a switch 300 for connecting field apparatuses to a 2-wire Ethernet bus system. Here, besides an uplink-side primary switch 301 and a downlink-side secondary switch 302, the switch comprises the PHY interface devices 101, 102 and also a unit 303 for galvanic isolation. In this case, the unit 303 for galvanic isolation comprises the comparators 131, 132, 133, 134 and also the digital optocouplers 141, 142, 143, 144 and is connected both to the uplink PHY interface device 101 on one side and to the downlink PHY interface device 102 on the other side. The uplink PHY interface device 101 is in turn connected to the primary switch 301, while the downlink PHY interface device 102 is connected to the secondary switch 302.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for galvanically isolating at least one apparatus which is connectable to a 2-wire Ethernet bus system, comprising:
    an uplink and a downlink physical layer (PHY) interface device, each PHY interface device comprising a transmitting unit and a receiving unit, and the receiving units each having two output terminals for providing a received ternary-coded signal as a differential signal;
    an uplink and a downlink signal split device, each connected to output terminals of an assigned receiving unit and configured to split a ternary-coded signal provided as differential signal into two binary-coded signals; and
    an uplink and a downlink optocoupler device, each connected to an assigned signal split device and configured to transfer two received binary-coded signals to a transmitting unit of an assigned PHY interface device.

2. The device as claimed in claim 1, wherein the uplink signal split device is connected to the output terminals of the receiving unit of the uplink PHY interface device; and wherein the downlink signal split device is connected to the output terminals of the receiving unit of the downlink PHY interface device.

3. The device as claimed in claim 1, wherein the uplink and downlink signal split devices are each formed by comparators, switching transistors or logic gates.

4. The device as claimed in claim 2, wherein the uplink and downlink signal split devices are each formed by comparators, switching transistors or logic gates.

5. The device as claimed in claim 3, wherein the uplink and downlink signal split devices are each formed by two comparators for a respective differential signal component and are configured to compare a respective differential signal component with a reference signal level.

6. The device as claimed in claim 3, wherein the ternary-coded signal is an MLT-3 signal comprising a negative signal level, a zero signal level and a positive signal level; and wherein the two binary-coded signals each comprise a zero signal level and a one signal level.

7. The device as claimed in claim 5, wherein the ternary-coded signal is an MLT-3 signal comprising a negative signal level, a zero signal level and a positive signal level; and wherein the two binary-coded signals each comprise a zero signal level and a one signal level.

8. The device as claimed in claim 6, wherein the uplink and downlink signal split devices are each configured to convert the negative signal level of the MLT-3 signal to the zero signal level of a first binary-coded signal and to the one signal level of a second binary-coded signal, the zero signal level of the MLT-3 signal to the same signal level of the first and second binary-coded signals and the positive signal level of the MLT-3 signal to the one signal level of the first binary-coded signal and to the zero signal level of the second binary-coded signal.

9. The device as claimed in claim 6, wherein the uplink and downlink signal split devices are each configured to convert the negative signal level of the MLT-3 signal to the one signal level of a first binary-coded signal and to the zero signal level of a second binary-coded signal, the zero signal level of the MLT-3 signal to the same signal level of the first and second binary-coded signals and the positive signal level of the MLT-3 signal to the zero signal level of the first binary-coded signal and to the one signal level of the second binary-coded signal.

10. The device as claimed in claim 8, wherein the uplink and downlink signal split devices are each configured to convert the zero signal level of the MLT-3 signal to the zero signal level of the first binary-coded signal and to the zero signal level of the second binary-coded signal or the zero signal level of the MLT-3 signal to the one signal level of the first binary-coded signal and to the one signal level of the second binary-coded signal.

11. The device as claimed in claim 9, wherein the uplink and downlink signal split devices are each configured to convert the zero signal level of the MLT-3 signal to the zero signal level of the first binary-coded signal and to the zero signal level of the second binary-coded signal or the zero signal level of the MLT-3 signal to the one signal level of the first binary-coded signal and to the one signal level of the second binary-coded signal.

12. The device as claimed in claim 1, wherein the uplink optocoupler device is connected to the uplink signal split device;
    wherein the downlink optocoupler device is connected to the downlink signal split device; and
    wherein the optocoupler devices each comprise two digital optocouplers for transferring one binary-coded signal of the two binary-coded signals.

13. The device as claimed in claim 1, wherein the device is configured for use in an intrinsically safe circuit and, in accordance with International Electrotechnical Commission (IEC) standard 60079-11, includes a safe link to line elements to be protected.

14. The device as claimed in claim 1, wherein the optocoupler devices each comprise two digital optocouplers, each having an input-side anode terminal, an input-side cathode terminal, a supply voltage terminal, an output signal terminal and an output-side ground terminal; and wherein the cathode terminals, the supply voltage terminals and the output signal terminals are each interconnected with limiting resistors for limiting at least one of voltage, current and power.

15. The device as claimed in claim 1, wherein the device is configured for connection to multiplexed supply lines of the 2-wire Ethernet bus system which are provided for simultaneous power and data transmission.

16. The device as claimed in claim 1, wherein the apparatus which is connectable to the 2-wire Ethernet bus system is configured in accordance with Ethernet Advanced Physical Layer.

17. A switch for connecting field apparatuses to a 2-wire Ethernet bus system, comprising
a device for galvanic isolation comprising an uplink and a downlink physical layer (PHY) interface device, an uplink and a downlink signal split device and an uplink and a downlink optocoupler device;
a primary switch connected to the uplink PHY interface device;
a secondary switch connected to the downlink PHY interface device;
wherein the uplink and downlink PHY interface devices each comprise a transmitting unit and a receiving unit, the receiving units each including two output terminals for providing a received ternary-coded signal as a differential signal;
wherein the uplink and downlink signal split devices are each connected to output terminals of an assigned receiving unit and are configured to split a ternary-coded signal provided as the differential signal into two binary coded signals; and
wherein the uplink and downlink optocoupler devices are each connected to an assigned signal split device and are configured to transfer two received binary-coded signals to a transmitting unit of an assigned PHY interface device.

* * * * *